June 15, 1965    R. E. WILLIAMS ETAL    3,189,108
WEIGHT COMPENSATING METHOD FOR AUTOMATIC NET WEIGHERS
Original Filed Aug. 22, 1962    2 Sheets-Sheet 1
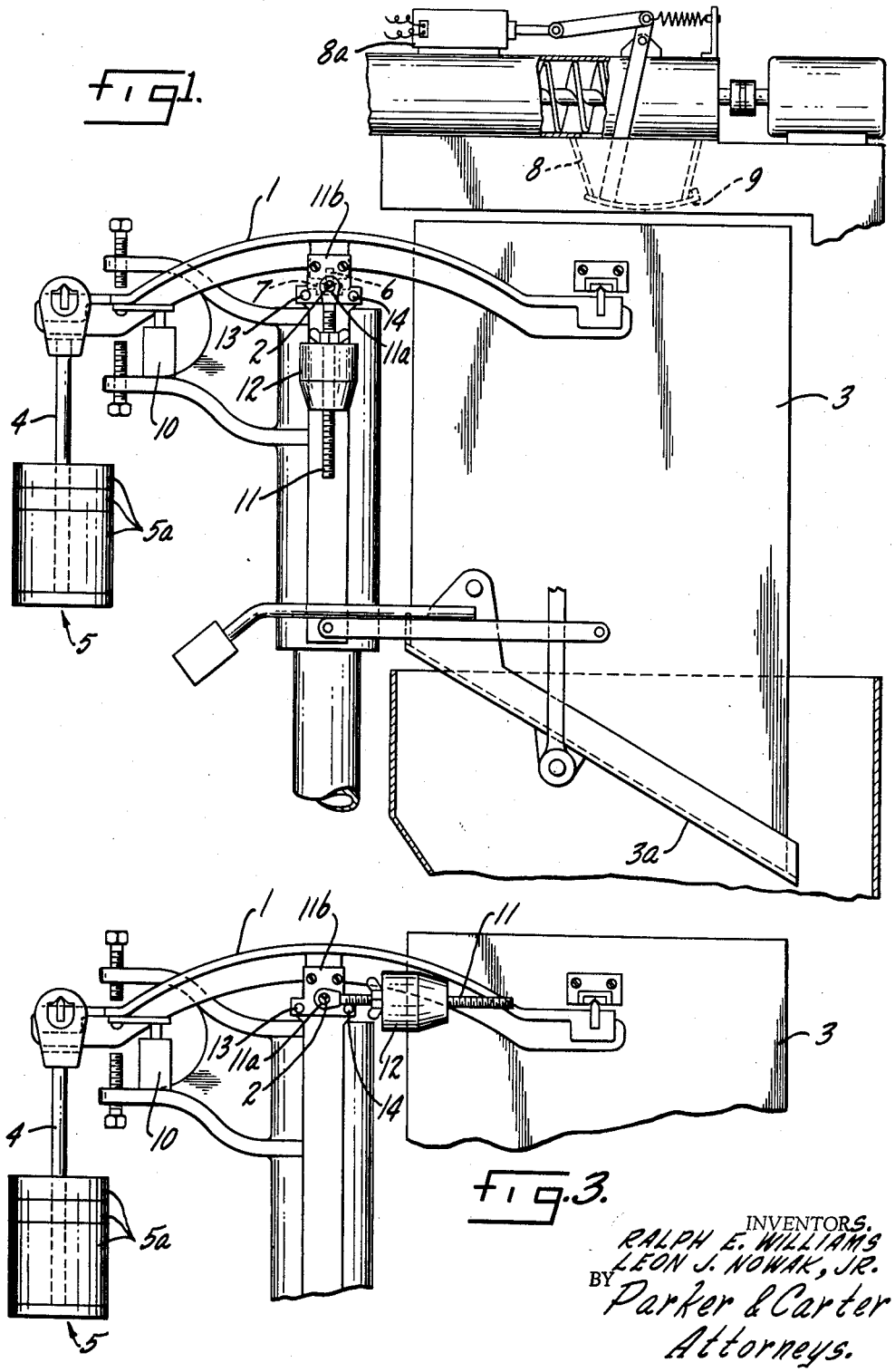
INVENTORS.
RALPH E. WILLIAMS
LEON J. NOWAK, JR.
BY Parker & Carter
Attorneys.

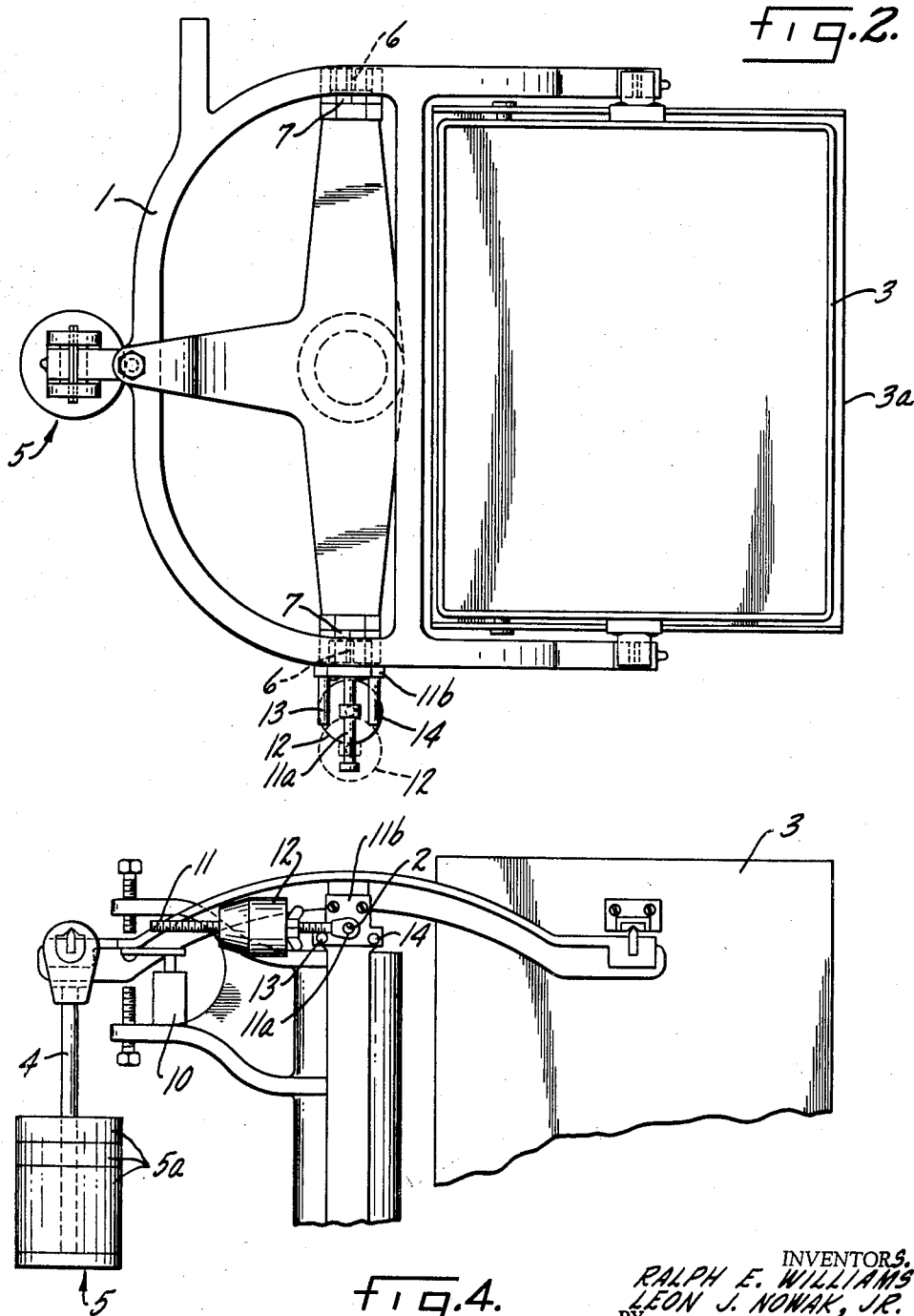

United States Patent Office 3,189,108
Patented June 15, 1965

3,189,108
WEIGHT COMPENSATING METHOD FOR AUTOMATIC NET WEIGHERS
Ralph E. Williams, La Grange, and Leon J. Nowak, Jr., Park Ridge, Ill., assignors to Blaw-Knox Company, Pittsburgh, Pa., a corporation of Delaware
Original application Ser. No. 218,736, Aug. 22, 1962. Divided and this application Aug. 4, 1964, Ser. No. 387,304
4 Claims. (Cl. 177—1)

This is a division of our copending application Serial No. 218,736, filed August 22, 1962.

This invention relates to automatic net weighing and to the method, in such weighing, of compensating for material which is "in flight" or in suspension when feeding means are actuated to terminate the delivery of a charge to the scale.

An example of a mechanism with which the method can be carried out is an automatic net weighing machine of the type wherein a material holding weigh bucket is supported at one end of a scale beam which is equipped to support weights or weight adjustment means at the other end, and a controlled flow of material to be weighed is delivered to the weigh bucket from a supply hopper in an automatic start and stop sequence.

In automatic net weighing machines of the type referred to the flow of material to the bucket is automatically interrupted or terminated when the bucket has a predetermined weight of material therein, which weight of material moves the bucket downwardly and actuates some mechanism for diverting or terminating the flow of material to the bucket. One disadvantage in the operation of such net weighing machines is found in the fact that a certain amount of material is delivered to the weigh bucket after the bucket has started its downward movement and after the hopper delivering material to the bucket has been closed. This material is "in flight" or suspension at the time the bucket moves downwardly and the hopper, or feeding chute, is closed. The result is that the weighed material in the bucket exceeds the poise or weight setting of the beam by the weight of material in suspension. This amount in suspension varies, depending on the rate of flow of material, and is an unknown quantity. Usually, when changing speed of operation or weights a series of test weights must be taken, and weight adjustment made by trial and error until the desired weight of material is obtained, and the proper setting known. Thus, it is difficult to set one of these weighing machines to deliver the exact and accurate weight of material desired.

A major purpose of the present invention is to overcome the aforementioned disadvantage and to provide a weighing method by which any desired weight of material may be quickly and accurately delivered, and whereby an automatic weighing machine may be quickly and accurately set to deliver any desired weight of material within its capacity rate per discharge from the basket.

Another purpose of the present invention is the provision of a system which makes it possible to check-weigh a predetermined mass of material in the weigh hopper of an automatic net weighing machine, and without resetting the regular weight or poise setting, a process that up until this development has required checking for accuracy of the material weight on a separate check weighing balance, or by moving and consequently disturbing the weight setting poise or weight.

Other objects and purposes will appear from time in the course of the ensuing specification and claims.

We illustrate herewith a structure which may be employed in connection with the practice of the above discussed method. Referring generally now to the drawings:

FIGURE 1 is a side elevation view of the improved system constituting the present invention;

FIGURE 2 is a plan view of the apparatus shown in FIGURE 1;

FIGURE 3 is a view similar to FIGURE 1 but illustrating another operative position of the elements in FIGURE 1; and FIGURE 4 is still another view similar to FIGURE 1 but illustrating a still further operative position of the elements of FIGURE 1.

Like elements are designated by like characters throughout the specification and drawings.

Referring specifically now to the drawings and in the first instance to FIGURE 1, numeral 1 represents a typical weigh beam which is supported intermediate its ends on a fulcrum 2. The weigh beam 1 supports a weigh bucket 3 at one end thereof and at the other end thereof supports a counterweight rod 4 and counterbalance 5 of sufficient weight to balance the beam with empty weight bucket and with which may be associated weights 5a of a predetermined desired magnitude for balancing the weight of the bucket 3 with the desired load therein. It should be understood that when the weigh bucket 3 is empty and weights 5a are removed the weigher is in even balance. The weigh bucket has a bottom closure 3a, which, when open, allows flow of material from the bucket. The weigh beam may be fulcrumed as by means of a pivot bar 6 having a knife edge resting in pivot blocks 7 supported on the base of the machine.

In apparatus of this type, a material delivery chute 8 is employed to deliver a stream of material to the bucket 3 in automatic timed sequence. The chute 8 may lead from any suitable feeder which is located below a supply hopper . The feeder may provide either a gravity or a power feed flow. The chute has a closure, diagrammatically represented at 9, for closing the chute and thereby terminating the flow of material to the bucket 3. In this type of automatic weighing machine, some mechanism, such as a switch 10 is associated with the weigh beam so as to actuate when the bucket end of the weigh beam moves downwardly in response to a predetermined weight of material in the bucket. The switch mechanism may, for example, actuate a solenoid 8a for moving the feed gate cut-off 9 to the closed position, in which position is it is shown in dotted lines in FIGURE 1.

According to the invention an auxiliary counterpoise rod is associated with the pivot 6 of the weigh beam. The rod is illustrated at 11 and is shown as pivotally mounted upon a pin 11a on a bracket 11b in precise and centered alignment with the pivot bar 6 of the weigh beam. It is also axially movable along the pin 11a. The pin 11a is coaxial with the pivot 6. When the counterpoise rod 11 is freely suspended upon the pin 11a it depends therefrom as shown in FIGURE 1, and does not exert force on either side of the beam from fulcrum 2—in other words, zero force. An adjustable weight 12 is positioned on the bar and may be screwthreaded thereon so as to enable adjustment of the weight along the length of the rod 11. Any suitable locking mechanism, such as a thumbscrew, may be used to maintain the weight 12 in any desired location along rod 11. Stops or retaining members 13 and 14 are positioned on each side of the fulcrum 2 and on the bracket 11b so that the auxiliary counterpoise rod 11 may be swung (clockwise or counterclockwise) to either side of the fulcrum 2 and held in either of the positions shown in FIGURE 3 and FIGURE 4. It is simply swung to a generally horizontal position and then moved axially along the pivot pin to a point where the rod 11 may rest on one of the stops 13 or 14. Thus the counterpoise weight associated with the rod 11 may be selectively positioned so that it is added to the weight of the bucket 3 and material therein, or added to the weight of the counterpoise weight 5.

Whereas we have described an operative method and shown and described a structure with which this method can be carried out, it should be understood that the method can be carried out by a wide variety of mechanisms. The scope of the invention should be limited only by the scope of the hereinafter added claims.

The use and operation of the invention are as follows:

We have illustrated and described a mechanism wherewith our method can be practiced. The illustration includes a showing of a typical net weighing machine in which the flow of material to the weigh bucket 3 is automatically terminated when a predetermined weight of the delivered load is in the bucket and the weigh bucket has moved downwardly in response to such a load. A machine of this class may be set to deliver any desired load by selecting a counterpoise weight of the proper magnitude to counterbalance the weight of the bucket and the load therein.

In this class of apparatus, however, the weigh bucket moves downwardly as soon as the load actually in the bucket, together with the weight of the bucket, is equal to the force created by the counterpoise weights 5a. The feed gate 9 is then closed but there is still an unknown mass of material "in flight" or suspension between the feed gate 9 and the weigh bucket 3. Thus the weight of the material actually in the bucket after the flow of material has been terminated will exceed the weight of the counterpoise by an amount equal to the weight of this matherial "in flight."

In order to enable the operator of the machine to quickly and accurately determine the exact amount of material that is delivered to the weigh bucket 3 during any operation, the operator first selects a counterpoise weight 5 of a magnitude equivalent to the weight of material actually desired in the bucket. The operator then starts the machine and the weigh beam automatically terminates the flow of material to the bucket just as soon as the mass of material in the bucket is sufficient to cause the bucket to move downwardly. The operator then positions the auxiliary counterpoise weight 12 on that side of the weigh beam pivot which will add to the biasing force provided by the main counterpoise 5. In the form of the invention shown in FIGURES 1 through 4, the weight is simply rotated until it moves outwardly to a position where the combined biasing force of the main counterpoise and the auxiliary weight will balance the bucket. The auxiliary weight rod is then moved axially along the pin 11a until it clears the holding member 13 and it is then swung to the other side of the pivot where such weight is then added to the biasing force produced by the material in the bucket. After it is swung to this position, the rod is again moved axially along the pin 11a until the rod may rest on the holding member 14. The mass of material in the bucket is then dumped. The operator then re-initiates operation of the machine and, during this second and subsequent weighings, the auxiliary weight added to the weight of material in the bucket will cause the bucket to move downwardly and thus terminate the flow of material from the feed chute prior to the time that the bucket actually has the desired amount of material therein. The auxiliary weight thus compensates for the material "in flight" at the time the flow of material is terminated and the final amount of material in the bucket is precisely equivalent to the magnitude of the counterpoise weight 5.

In the strucutures above discussed the weight of material "in flight" after the feed chute has closed is anticipated and counteracted by the auxiliary counterpoise. This counterpoise is shown in FIGURE 1 in its initial or neutral, generally vertical position, with the axis of the elongated member 11 concentric with or in the vertical plane of the axis of the weigh beam 1. In the use of the invention the feed chute is closed prior to the time that the desired weight of material is actually in the bucket. The apparatus and the method were developed essentially to eliminate trial and error and the inaccuracy of manual resetting. The user need not know the amount or weight of the material "in flight." Thus the user is completely freed from the necessity of measuring or determining the weight of the material "in flight." However, when he sets the auxiliary weight in the proper position at one side of the weigh bar axis he does not change the adjustment or make any determination of actual weight. He merely swings the auxiliary weight to the opposite side of the weigh bar axis, knowing that in that position it will compensate for the material "in flight."

We claim:

1. The method of operating an automatic net weighing machine having a movable weigh beam carrying a counterpoise weight and a bucket and a material feed terminable by movement of the beam, including the steps of setting the weight for a predetermined desired weight of material in the bucket, initiating a flow of material to the bucket and terminating the flow in response to movement of the weigh beam whereby a mass of material is delivered to the bucket after movement of the weigh beam, adding a biasing force to said weigh beam in amounts sufficient to then balance the weigh beam, then removing said force and adding a force of identical magnitude to the weigh beam but opposed to the direction of the first named force, dumping the bucket, and then initiating the flow of material to the bucket, and thereby automatically obtaining the desired net weight on following discharges without further adjustment.

2. The method of correcting an automatic weighing machine for the amount of material delivered to a weighing container after flow of material from a discharge chute opening has been terminated by movement of a weighing beam, including the steps of adding a weight to a weigh beam in a manner such as to balance the beam after an initial load of material in the container has brought the weigh beam to an unbalanced condition and terminated the flow of material to the container, then removing said weight and adding a weight of the same magnitude to the beam at such a point that the then added weight is combined with the weight of the weighing container and load therein, dumping the container, and then initiating operation of the weighing machine whereby the weight of material in flight, when the flow of material is terminated, is automatically compensated by the added weight.

3. A method of compensating for the mass of in-suspension material delivered to a material receiving receptacle in a beam weigher of the type in which a desired mass of material and a weight of equal mass are balanced against one another on opposite sides of a fulcrum, said method including the steps of setting the weight on one side of the fulcrum, delivering material to the receptacle on the other side of the fulcrum, shutting off delivery of material to the receptacle when the receptacle begins to move to its filled position, adding an additional force to the weight side of the fulcrum sufficient to balance the mass of material in the receptacle, including the in-suspension material, removing the additional force from the weight side of the fulcrum, and adding said additional force to the receptacle side of the fulcrum.

4. The method of operating an automatic net weighing machine having a movable weigh beam carrying a counterpoise weight and a bucket and a material feed terminable by movement of the beam, including the steps of setting the weight for a predetermined desired weight of material in the bucket, initiating a flow of material to the bucket and terminating the flow in response to movement of the weigh beam whereby a mass of material is delivered to the bucket after movement of the weigh beam, adding a biasing force to the weigh beam sufficient to then balance the weigh beam, then moving said force to a corresponding position on the opposite side of the weigh beam, dumping the bucket, and then initiating the flow of material to the bucket.

References Cited by the Examiner
UNITED STATES PATENTS

| | | | |
|---|---|---|---|
| 536,344 | 3/95 | Gorringe | 177—115 |
| 687,855 | 12/01 | Roth | 177—190 |
| 831,164 | 9/06 | King | 177—190 |
| 838,503 | 12/06 | George | 177—68 |
| 1,663,129 | 3/28 | Hopkinson | 177—1 |
| 1,885,356 | 11/32 | Karrer | 177—1 |
| 2,348,372 | 5/44 | Weckerly | 177—107 |
| 2,650,791 | 9/53 | Adams | 177—114 |
| 2,781,993 | 2/57 | Magnuson | 177—1 |

FOREIGN PATENTS

| | | |
|---|---|---|
| 235,825 | 6/25 | Great Britain. |

LEYLAND M. MARTIN, *Primary Examiner.*